US008332156B2

(12) United States Patent
Liu et al.

(10) Patent No.: US 8,332,156 B2
(45) Date of Patent: Dec. 11, 2012

(54) METHOD FOR PROPAGATING PSEUDO ACOUSTIC QUASI-P WAVES IN ANISOTROPIC MEDIA

(75) Inventors: Wei Liu, San Ramon, CA (US); Kenneth P. Bube, Seattle, WA (US)

(73) Assignee: Chevron U.S.A. Inc., San Ramon, CA (US)

( * ) Notice: Subject to any disclaimer, the term of this patent is extended or adjusted under 35 U.S.C. 154(b) by 501 days.

(21) Appl. No.: 12/500,815

(22) Filed: Jul. 10, 2009

(65) Prior Publication Data

US 2011/0007604 A1 Jan. 13, 2011

(51) Int. Cl.
*G01V 1/00* (2006.01)
(52) U.S. Cl. ............ 702/14; 702/18; 702/127; 702/156
(58) Field of Classification Search .................. 702/11, 702/14, 156
See application file for complete search history.

(56) References Cited

U.S. PATENT DOCUMENTS

| 5,737,220 | A | * | 4/1998 | Miller ............................ 702/14 |
| 6,044,039 | A | * | 3/2000 | Dunand et al. .................. 367/25 |
| 6,791,901 | B1 | * | 9/2004 | Robertsson et al. ............ 367/58 |
| 2006/0098529 | A1 | * | 5/2006 | Anderson et al. ............... 367/38 |
| 2006/0265132 | A1 | * | 11/2006 | Rickett ........................... 702/14 |
| 2007/0265782 | A1 | | 11/2007 | Kleinberg et al. |

FOREIGN PATENT DOCUMENTS

| JP | 2006-106856 A | 4/2006 |
| KR | 10-1981-00000683 B1 | 6/1981 |
| KR | 10-0660562 B1 | 12/2006 |

OTHER PUBLICATIONS

Zhou et al., An anisotropic acoustic wave equation for modeling and migration in 2D TTI media, SEG/New Orleans 2006 Annual Meeting, pp. 194-198.
Thomsen et al., Weak elastic anisotropy, Geophysics, Oct. 1986, pp. 1954-1966, vol. 51, Amoco Production Company.
Grechka et al., Shear waves in acoustic anistropic media, Geophysics, Mar.-Apr. 2004, pp. 576-582, vol. 69 No. 2, Society of Exploration Geophysicists.
Alkhalifah, An acoustic wave equation for anistropic media, Geophysics, Jul.-Aug. 2000, vol. 65 No. 4, pp. 1239-1250, Society of Exploration Geophysicists.
Du et al., A new Pseudo-acoustic Wave Equation for VTI Media, 70$^{th}$ EAGE Conference & Exhibition, Rome, Italy, Jun. 9-12, 2008.
Lesage et al., Hybrid Finite Difference-pseudospectral Method for 3D RTM in TTI Media, 70$^{th}$ EAGE Conference & Exhibition, Rome, Italy, Jun. 9-12, 2008.
Zhou et al., An Anisotropic Acoustic Wave Equation for VTI Media, EAGE 68$^{th}$ Conference & Exhibition, Vienna, Austria, Jun. 12-15, 2006.

* cited by examiner

*Primary Examiner* — Mischita Henson
(74) *Attorney, Agent, or Firm* — Marie L. Clapp

(57) ABSTRACT

A computer-implemented method for pseudo acoustic quasi-P wave propagation which remain stable in anisotropic media with variable tilt and is not limited to weak anisotropic conditions. The method includes acquiring a seismic exploration volume for a subsurface region of interest, and determining a modeling geometry for the seismic exploration volume. The method further includes propagating at least one wavefield through the seismic exploration volume utilizing the modeling geometry and initial conditions and preventing the accumulation of energy along the axis of symmetry of the seismic exploration volume and ensuring positive stiffness coefficients in the stress-strain relations through the use of finite quasi-S wave velocities thereby producing a stable wavefield. The method includes utilizing the stable wavefield to generate subsurface images of the subsurface region of interest.

11 Claims, 14 Drawing Sheets

METHOD FOR PROPAGATING PSEUDO ACOUSTIC QUASI-P WAVES IN ANISOTROPIC MEDIA

FIELD OF THE INVENTION

The present invention relates generally to geophysical prospecting using seismic signals, and in particular a method for propagating pseudo-acoustic quasi-P wave propagation in variable tilted anisotropic media and using the propagated wavefields for subsurface property characterization.

BACKGROUND OF THE INVENTION

Anisotropy is ubiquitously observed in many oil and gas exploration areas (e.g., the Gulf of Mexico, the North Sea, and offshore West Africa) because of preferred ordering of minerals and defects related to stresses. In these regions, often the rock properties can be characterized as transversely isotropic ("TI") media with either a vertical or tilted axis of symmetry. Wave propagation in anisotropic media exhibits different kinematics and dynamics from that in isotropic media, thus, it requires anisotropic modeling and migration methods to image reservoirs properly for oil and gas exploration.

Three-dimensional ("3D") anisotropic seismic modeling and migration, however, are computationally intensive tasks. Compared to prior art solutions of full elasticity, modeling and migration based on dispersion relations are computationally efficient alternatives. In one prior art method, Alkhalifah (2000), a pseudo-acoustic approximation for vertical transversely isotropic ("VTI") media was introduced. In the approximation of that prior art method, the phase velocity of shear waves is set to zero along the vertical axis of symmetry. This simplification doesn't eliminate shear waves in other directions as described by Grechka et al. (2004). Based on Alkhalifah's approximation, several space- and time-domain pseudo-acoustic partial differential equations (PDEs) have been proposed (Alkhalifah, 2000; Zhou et al., 2006; and Du et al., 2008) for seismic modeling and migration in VTI media. These systems of PDEs are close approximations in kinematics to the solutions of full elasticity involving vector fields.

As an extension from VTI media, the axis of symmetry of a TI medium can be tilted ("TTI") as observed in regions associated with anticlinal structures and/or thrust sheets. Zhou et al. (2006) extended their VTI pseudo-acoustic equations to a system for 2D TTI media by applying a rotation about the axis of symmetry. Consequently the phase velocity of quasi-SV waves is zero in the direction parallel or perpendicular to the tilted axis. Lesage et al. (2008) further extended Zhou's TTI system from 2D to 3D based on the same phase velocity approximation. However, these prior art pseudo-acoustic modeling and migration methods can become numerically unstable due to rapid lateral variations in tilt and/or certain rock properties (when the vertical velocity is greater than the horizontal velocity) and result in unstable wave propagation.

As one skilled in the art will appreciate, the plane-wave polarization vector in isotropic media is either parallel (for P-waves) or orthogonal (for S-waves) to the slowness vector. Except for specific propagation directions, there are no pure longitudinal and shear waves in anisotropic media. For that reason, in anisotropic wave theory the fast mode is often referred to as the "quasi-P" wave and the slow modes "quasi-$S_1$" and "quasi-$S_2$".

SUMMARY OF THE INVENTION

The present invention provides both a pseudo-acoustic modeling method and a pseudo-acoustic migration method for anisotropic media. Aspects of embodiments of the present invention include a computer-implemented method for pseudo acoustic quasi-P wave propagation which remain stable in variable-tilt anisotropic media and is not limited to weak anisotropic conditions. The method also includes establishing a seismic data set corresponding to a seismic exploration volume for a subsurface region of interest from available previously acquired seismic data, and determining a modeling geometry for the seismic exploration volume. The method further includes propagating at least one wavefield through the seismic exploration volume utilizing the modeling geometry for initial conditions and preventing the accumulation of energy along the axis of symmetry as well as ensuring positive stiffness coefficients in the stress-strain relations through the use of a small finite quasi-S wave velocity thereby producing a stable wavefield. The method includes utilizing the stable wavefield to generate subsurface images of the subsurface region of interest.

Another embodiment of the present invention includes a geophysical seismic migration method comprising the steps of establishing a seismic data set and a velocity/anisotropy model corresponding to a seismic exploration volume, and for each common shot/receiver record, setting boundary conditions to include excitation from source location(s). The embodiment further includes propagating wavefields forward according to a pseudo-acoustic wave equation or its equivalents:

$$\begin{cases} \dfrac{\partial^2}{\partial t^2}P = \begin{aligned}& v_{P0}^2[((1+2\varepsilon)f_2 + f_1) - (f-1)f_3]P + \\ & v_{P0}^4[2f(\delta-\varepsilon)f_1f_2 + (f-1)((1+2\varepsilon)f_2 + f_1)f_3]Q\end{aligned} \\ \dfrac{\partial^2}{\partial t^2}Q = P \end{cases} \quad [1]$$

where:

$$\begin{cases} f = 1 - \left(\dfrac{v_{s_0}}{v_{P_0}}\right)^2 \\ f_1 = \sin^2\theta_0\left(\cos^2\phi_0\dfrac{\partial^2}{\partial x^2} + \sin^2\phi_0\dfrac{\partial^2}{\partial y^2} + \sin 2\phi_0\dfrac{\partial}{\partial x}\dfrac{\partial}{\partial y}\right) + \\ \quad \cos^2\theta_0\dfrac{\partial^2}{\partial z^2} + \sin 2\theta_0\left(\cos\phi_0\dfrac{\partial}{\partial x}\dfrac{\partial}{\partial z} + \sin\phi_0\dfrac{\partial}{\partial y}\dfrac{\partial}{\partial z}\right) \\ f_2 = (1 - \sin^2\theta_0\cos^2\phi_0)\dfrac{\partial^2}{\partial x^2} + (1 - \sin^2\theta_0\sin^2\phi_0)\dfrac{\partial^2}{\partial y^2} + \\ \quad \sin^2\theta_0\dfrac{\partial^2}{\partial z^2} - \sin^2\theta_0\sin 2\phi_0\dfrac{\partial}{\partial x}\dfrac{\partial}{\partial y} - \\ \quad \sin 2\theta_0\left(\cos\phi_0\dfrac{\partial}{\partial x}\dfrac{\partial}{\partial z} + \sin\phi_0\dfrac{\partial}{\partial y}\dfrac{\partial}{\partial z}\right) \\ f_3 = f_1 + f_2 = \dfrac{\partial^2}{\partial x^2} + \dfrac{\partial^2}{\partial y^2} + \dfrac{\partial^2}{\partial z^2} \end{cases}$$

$Vs_0$ is the vertical velocity of quasi-SV waves, $Vp_0$ is the vertical velocity of quasi-P waves, $\theta_0$ is the tilt of the axis of symmetry with respect to the vertical in a TI medium, $\phi_0$ is the azimuth of the axis of symmetry, $\epsilon$, $\delta$ are the Thomsen anisotropy parameters, P is a scalar wavefield, and Q is an auxiliary function. The embodiment also includes for each common shot/receiver record, setting boundary conditions to back propagate a recorded shot record, and propagating seismic data backward according to the above pseudo-acoustic wave equations. The embodiment includes applying imaging conditions such as (but not limited to) cross correlation between the computed forward wavefields and backward wavefields or their equivalent Green's functions to derive subsurface images.

An additional embodiment of the present invention also includes the step of propagating wavefields or calculating Green's functions by reverse time migration (RTM), Gaussian beam migration, Kirchhoff migration or other wave equation based migrations.

An additional embodiment of the present invention also includes the step of applying imaging condition involving illumination normalization and/or reflection-angle domain gather generation and/or phase-amplitude compensation in addition to cross correlation as options.

An additional embodiment of the present invention also includes the step of processing common-shot/receiver signals and propagating wavefields in other dependent domains, including but not limited to common offset, common azimuth, and common reflection-angle, and in other modeling and migration forms, including but not limited to delayed shot, plane-wave, and phase encoding.

An additional embodiment of the present invention also includes the step of propagating wavefields or calculating Green's functions using other equivalent terms such as normal moveout velocity, horizontal velocity instead of Thomsen parameters.

An additional embodiment of the present invention includes a geophysical seismic migration method comprising the steps of establishing a seismic data set and a velocity/anisotropy model corresponding to a seismic exploration volume, and for each common shot/receiver record, setting boundary conditions to include excitation from source location(s). The embodiment also includes propagating wavefields forward according to the following pseudo-acoustic wave equation or its equivalents:

$$\begin{cases} \frac{\partial^2}{\partial t^2} P = v_{P0}^2 [((1+2\varepsilon)f_2 + f_1) - (f-1)f_3]P + \\ \quad v_{P0}^4 [2f(\delta-\varepsilon)f_1 f_2 + (f-1)((1+2\varepsilon)f_2 + f_1)f_3]Q \\ \frac{\partial^2}{\partial t^2} Q = v_{P0}^2 P \end{cases} \quad [2]$$

The embodiment further includes for each common shot/receiver record, setting boundary conditions to back propagate a recorded shot record, and propagating seismic data backward according to the above pseudo-acoustic wave equations. The embodiment includes applying imaging conditions such as (but not limited to) cross correlation between the computed forward wavefields and backward wavefields or their equivalent Green's functions to derive subsurface images.

Different embodiments of the present invention may utilize other pseudo-acoustic wave equations to propagate wavefields forward in geophysical seismic migration. For example, one embodiment of the present invention includes propagating wavefields forward according to the pseudo-acoustic wave equation below or its equivalents:

$$\begin{cases} \omega^2 P = v_{P0}^2 [((1+2\varepsilon)f_2 + f_1) - (f-1)f_3]P + \\ \quad v_{P0}^4 [2f(\delta-\varepsilon)f_1 f_2 + (f-1)((1+2\varepsilon)f_2 + f_1)f_3]Q \\ \omega^2 Q = P \end{cases} \quad [3]$$

where $\omega$ is the angular frequency.

A further embodiment of the present invention that is utilized for geophysical seismic migration includes propagating wavefields forward according to the pseudo-acoustic wave equation or its equivalents:

$$\begin{cases} \frac{\partial^2}{\partial t^2} P = v_{P0}^2 [((1+2\varepsilon)f_2 + f_1) - (f-1)f_3]P + \\ \quad v_{P0}^4 f[(1+2\delta) - (1+2\varepsilon)]f_1 Q + v_{P0}^4 (f-1)[(1+2\varepsilon)f_2 + f_1]R \\ \frac{\partial^2}{\partial t^2} Q = f_2 P \\ \frac{\partial^2}{\partial t^2} R = f_3 P \end{cases} \quad [4]$$

where Q and R are auxiliary functions.

Another embodiment of the present invention includes a geophysical seismic migration method comprising the steps of establishing a seismic data set and a velocity/anisotropy model corresponding to a seismic exploration volume, and for each common shot/receiver record, setting boundary conditions to include excitation from source location(s). The embodiment also includes propagating wavefields forward according to a pseudo-acoustic wave equation and its equivalent formulations for tilted media:

$$\begin{cases} \frac{\partial}{\partial t} P = (1+2\eta) v_{nmo}^2 \left( \frac{\partial}{\partial x} U + \frac{\partial}{\partial y} V \right) + \frac{v_{P0}^2}{1+2\eta} \frac{\partial}{\partial z} R \\ \frac{\partial}{\partial t} U = \frac{\partial}{\partial x} P \\ \frac{\partial}{\partial t} V = \frac{\partial}{\partial y} P \\ \frac{\partial}{\partial t} Q = \frac{v_{P0}^2}{1+2\eta} \frac{\partial}{\partial z} R \\ \frac{\partial}{\partial t} R = \frac{\partial}{\partial z} P + 2\eta \frac{\partial}{\partial z} Q \end{cases} \quad [5]$$

$v_{p_0}$ is the vertical velocity of quasi-P waves, $v_{nmo} = v_{p_0} \sqrt{1+2\delta}$ is the normal-moveout velocity of quasi-P waves, $\eta = (\varepsilon - \delta)/(1 + 2\delta)$ is the Alkhalifah-Tsvankin anisotropy parameter (expressed in terms of the Thomsen anisotropy parameters $\varepsilon$ and $\delta$), P is a scalar wavefield, and U, V, Q, and R are auxiliary functions. The embodiment further includes for each common shot/receiver record, setting boundary conditions to back propagate a recorded shot record, and propagating seismic data backward according to the above pseudo-acoustic wave equations. The embodiment includes applying imaging conditions such as cross correlation between the computed forward and backward wavefields or their equivalent Green's functions to derive subsurface images.

Different embodiments of the present invention for geophysical seismic migration may utilize other pseudo-acoustic wave equations to propagate wavefields forward for tilted media. For example, one embodiment of the present invention includes propagating wavefields forward according to a pseudo-acoustic wave equation and its equivalent formulations for tilted media:

$$\begin{cases} \frac{\partial^2}{\partial t^2} P = [(1+2\eta)v_{nmo}^2 + av_{po}^2]g_2 P + (1+a)v_{po}^2 g_1 P - \\ \quad a(1+2\eta)v_{nmo}^2 g_2 Q - [(2\eta + a)v_{nmo}^2 + av_{po}^2]g_1 Q - av_{po}^2 g_1 R \\ \frac{\partial^2}{\partial t^2} Q = v_{po}^2 g_2 P \\ \frac{\partial^2}{\partial t^2} R = v_{po}^2 g_1 P \end{cases} \quad [6]$$

where $$\begin{cases} a = 1 - f = (v_{s_0}/v_{p_0})^2 \\ g_1 = \dfrac{\partial^2}{\partial z^2} \\ g_1 = \dfrac{\partial^2}{\partial x^2} + \dfrac{\partial^2}{\partial y^2} \end{cases}$$

$v_{p_0}$ is the vertical velocity of quasi-P waves, $v_{nmo}=v_{p_0}\sqrt{1+2\delta}$ is the normal-moveout velocity of quasi-P waves, a is the square of the shear-wave to P-wave velocity ratio, $\eta=(\epsilon-\delta)/(1+2\delta)$ is the Alkhalifah-Tsvankin anisotropy parameter (expressed in terms of the Thomsen anisotropy parameters $\epsilon$ and $\delta$), and Q and R are auxiliary functions.

A further embodiment of the present invention that is utilized for geophysical seismic migration includes propagating wavefields forward according to a pseudo-acoustic wave equation and its equivalent formulation for tilted media or their derivative formulations/equivalents:

$$\frac{\partial^4}{\partial t^4}F - \left\{[(1+2\eta)v_{nmo}^2 + av_{po}^2]\left(\frac{\partial^4}{\partial x^2 \partial t^2}F + \frac{\partial^4}{\partial y^2 \partial t^2}F\right) + \right. \quad [7]$$
$$\left. (1+a)v_{po}^2\left(\frac{\partial^4}{\partial z^2 \partial t^2}F\right)\right\} + a(1+2\eta)v_{nmo}^2$$
$$v_{po}^2\left(\frac{\partial^4}{\partial x^4}F + \frac{\partial^4}{\partial x^2 \partial y^2}F + \frac{\partial^4}{\partial y^4}F\right) + [(2\eta+a)v_{nmo}^2 v_{po}^2 + av_{po}^4]$$
$$\left(\frac{\partial^4}{\partial x^2 \partial z^2}F + \frac{\partial^4}{\partial y^2 \partial z^2}F\right) + av_{po}^4\left(\frac{\partial^4}{\partial z^2}F\right) = 0$$

where F is a scalar wavefield.

Another embodiment of the present invention includes a geophysical seismic migration method comprising the steps of establishing a seismic data set and a velocity/anisotropy model corresponding to a seismic exploration volume, and for each common shot/receiver record, setting boundary conditions to include excitation from source location(s). The embodiment also includes propagating wavefields forward according to a pseudo-acoustic wave equation or its derivative formulations/equivalents:

$$\frac{\partial^4 P}{\partial t^4} - v_{po}^2[(1+2\epsilon)f_2 + f_1 - (f-1)f_3]\frac{\partial^2 P}{\partial t^2} + \quad [8]$$
$$v_{po}^4[2f(\epsilon-\delta)f_1 f_2 - (f-1)((1+2\epsilon)f_2 + f_1)f_3]P = 0$$

The embodiment further includes for each common shot/receiver record, setting boundary conditions to back propagate a recorded shot record, and propagating seismic data backward according to the above pseudo-acoustic wave equations. The embodiment includes applying imaging conditions such as (but not limited to) cross correlation between the computed forward and backward wavefields or their equivalent Green's functions to derive subsurface images.

Another embodiment of the present invention includes a geophysical seismic modeling method comprising the steps of establishing a velocity/anisotropy model corresponding to a seismic exploration volume, and for each shot, setting initial conditions of wavefields. The embodiment also includes propagating wavefields forward according to a pseudo-acoustic wave equation or its equivalents:

$$\begin{cases} \dfrac{\partial^2}{\partial t^2}P = v_{P0}^2[((1+2\epsilon)f_2 + f_1) - (f-1)f_3]P + \\ \quad v_{P0}^4[2f(\delta-\epsilon)f_1 f_2 + (f-1)((1+2\epsilon)f_2 + f_1)f_3]Q + \\ \quad \delta(\vec{x}-\vec{x}_s)w(t) \\ \dfrac{\partial^2}{\partial t^2}Q = P + \delta(\vec{x}-\vec{x}_s)w(t) \end{cases} \quad [9]$$

where w(t) is a source function, and $\vec{x}_s$ is the vector of the source location. The source term and its form of insertion can be changed without affecting the governing PDEs.

Another embodiment of the present invention that is utilized for geophysical seismic modeling includes propagating wavefields forward according to a pseudo-acoustic wave equation (equation 5) and its equivalent formulations for tilted media.

Another embodiment of the present invention that is utilized for geophysical seismic modeling includes propagating wavefields forward according to a pseudo-acoustic wave equation (equation 6) and its equivalent formulations for tilted media.

It should also be appreciated that the present invention is intended to be used with a system which includes, in general, an electronic configuration including at least one processor, at least one memory device for storing program code or other data, an optional video monitor or other display device (i.e., a liquid crystal display) and at least one input device. The processor is preferably a microprocessor or microcontroller-based platform which is capable of displaying images and processing complex mathematical algorithms. The memory device can include random access memory (RAM) for storing event or other data generated or used during a particular process associated with the present invention. The memory device can also include read only memory (ROM) for storing the program code for the controls and processes of the present invention.

One such embodiment includes a system configured to perform pseudo acoustic quasi-P wave propagation which remain stable in variable tilt anisotropic media and is not limited to weak anisotropic conditions. The system includes a data storage device having computer readable data including a seismic exploration volume for a subsurface region of interest, and a processor, configured and arranged to execute machine executable instructions stored in a processor accessible memory for performing a method. The method for this particular embodiment includes determining a modeling geometry for the seismic exploration volume, and propagating at least one wavefield through the seismic exploration volume utilizing the modeling geometry for initial conditions and preventing the accumulation of energy along the axis of symmetry of anisotropic regions within the seismic exploration volume and ensuring positive stiffness coefficients in the stress-strain relations thereby producing a stable wavefield. The method further includes utilizing the stable wavefield to generate subsurface images of the subsurface region of interest.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood,

DETAILED DESCRIPTION

Figure 1:
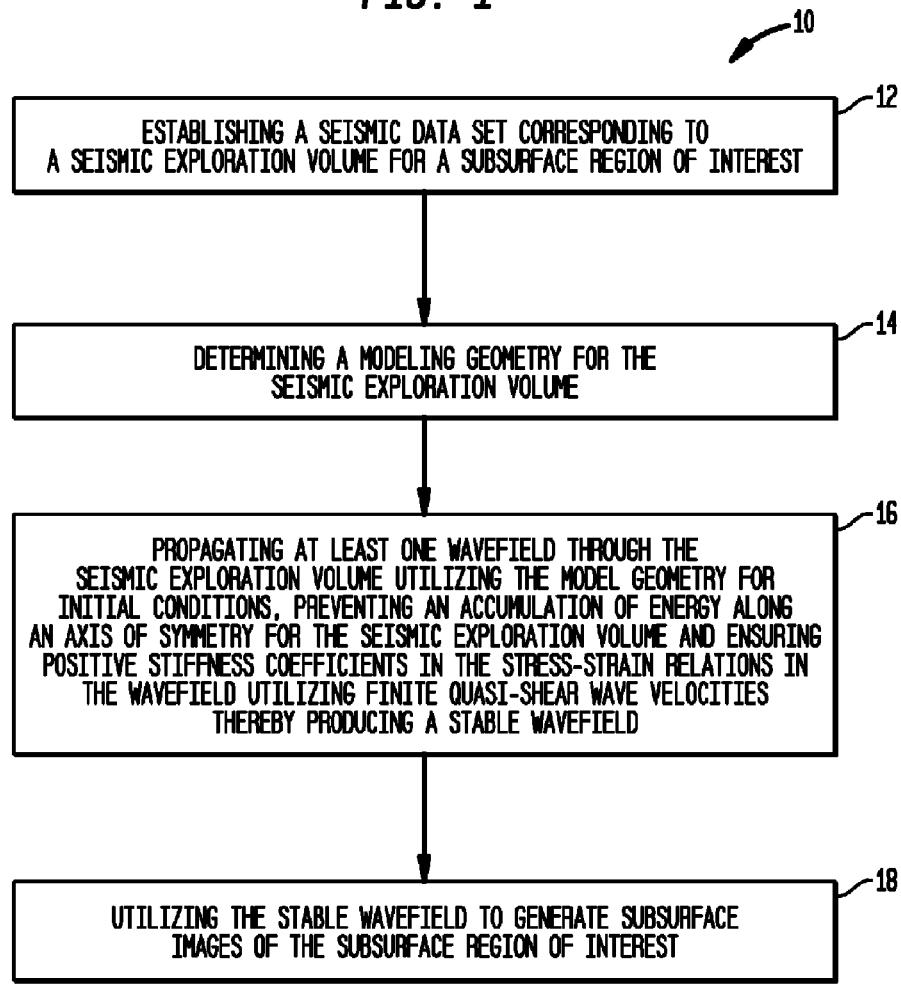
FIG. 1 is a flow chart illustrating a method in accordance with one or more embodiments of the present invention.

One embodiment of the present invention is illustrated in FIG. 1, wherein a flow chart 10 describes a method for propagating quasi-P waves which remain stable in anisotropic media with variable tilt. The present invention is not limited to weak anisotropic conditions. This particular embodiment includes establishing a seismic data set corresponding to a seismic exploration volume for a subsurface region of interest 12 from available previously acquired seismic data, and determining a modeling geometry for the seismic exploration volume 14. The embodiment further includes propagating at least one wavefield through the seismic exploration volume utilizing the modeling geometry for initial conditions and preventing the accumulation of energy along the axis of symmetry for the seismic exploration volume and ensuring positive stiffness coefficients in the stress-and-strain relations utilizing finite quasi-S wave velocities thereby producing a stable wavefield 16. The stable wavefield can then be utilized to generate subsurface images of the subsurface region of interest 18.

Figure 2:
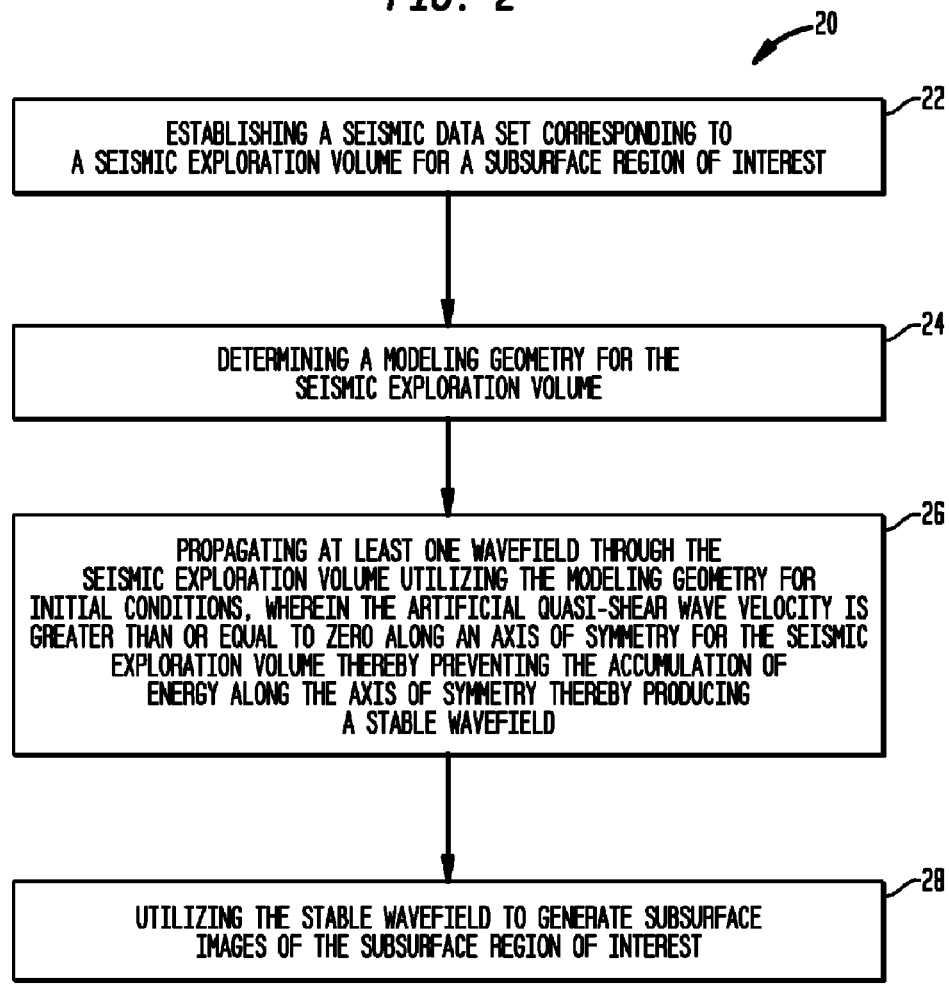
FIG. 2 is a flow chart illustrating a method in accordance with one or more embodiments of the present invention.

As one in skilled in the art will appreciate, differing embodiments of the present invention may provide a pseudo-acoustic modeling method or a pseudo-acoustic migration method for anisotropic media. For example, FIG. 2 illustrates a flowchart 20 for one embodiment of a pseudo-acoustic modeling method for wave propagation in anisotropic media with variable tilt, wherein the method is not limited to weak anisotropic conditions. That embodiment includes establishing a seismic data set corresponding to a seismic exploration volume for a subsurface region of interest 22 from available previously acquired seismic data, and determining a modeling geometry for the seismic exploration volume 24. The embodiment also includes propagating at least one wavefield through the seismic exploration volume utilizing the modeling geometry for initial conditions, wherein the artificial quasi-shear wave velocity is greater or equal to zero along the axis of symmetry for the seismic exploration volume thereby preventing the accumulation of energy along the axis of symmetry thereby producing a stable wavefield 26. The stable wavefield can then be utilized to generate subsurface images for the subsurface region of interest 28.

Figure 3:
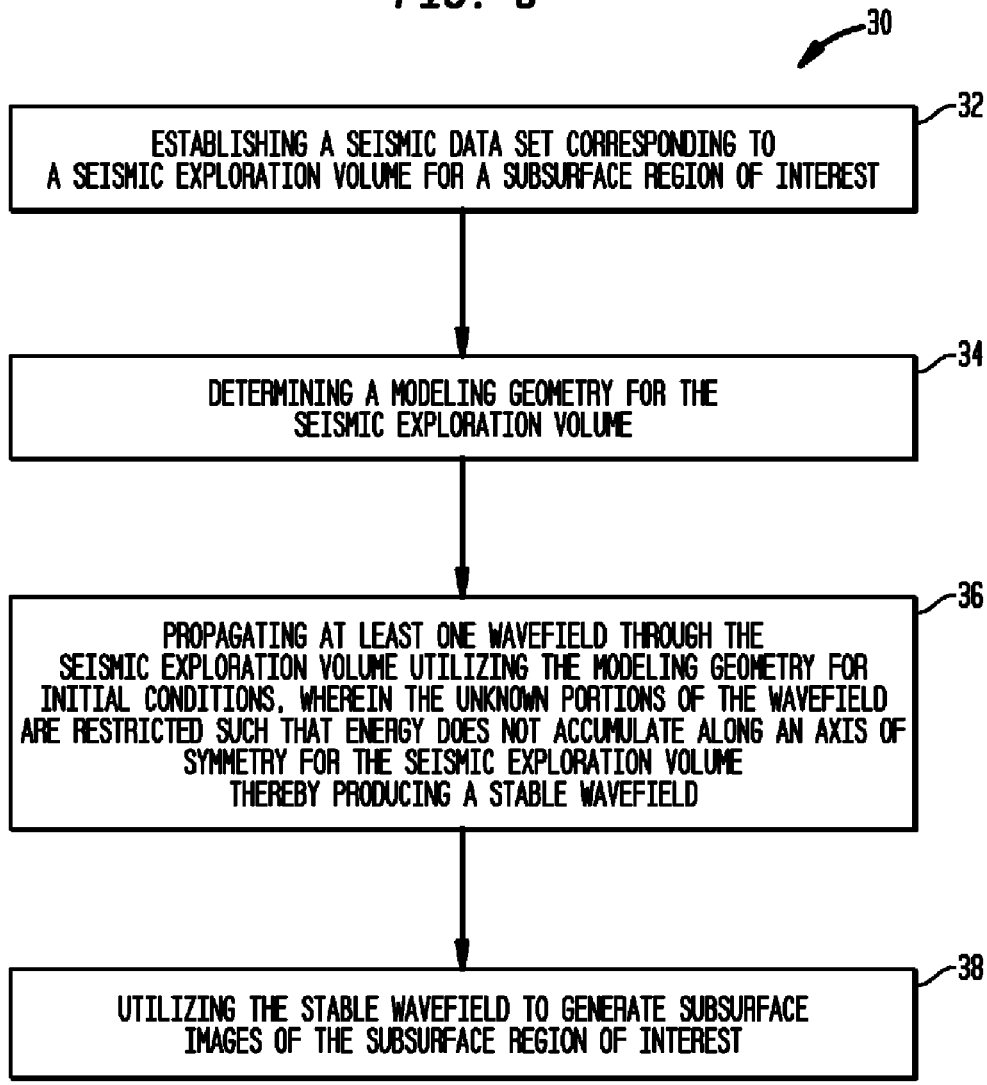
FIG. 3 is a flow chart illustrating a method in accordance with one or more embodiments of the present invention.

FIG. 3 illustrates a flowchart 30 for another embodiment of the present invention that can be used for pseudo-acoustic migration. That embodiment establishing a seismic data set corresponding to a seismic exploration volume for a subsurface region of interest 32 from available previously acquired seismic data, and determining a model geometry for the seismic exploration volume 34. The embodiment also includes propagating at least one wavefield through the seismic exploration volume utilizing the modeling geometry for initial conditions, wherein quasi-shear wave energy does not accumulate along the axis of symmetry for the seismic exploration volume thereby producing a stable wavefield 36. The stable wavefield can then be utilized to generate subsurface images for the subsurface region of interest 38.

Figure 4:
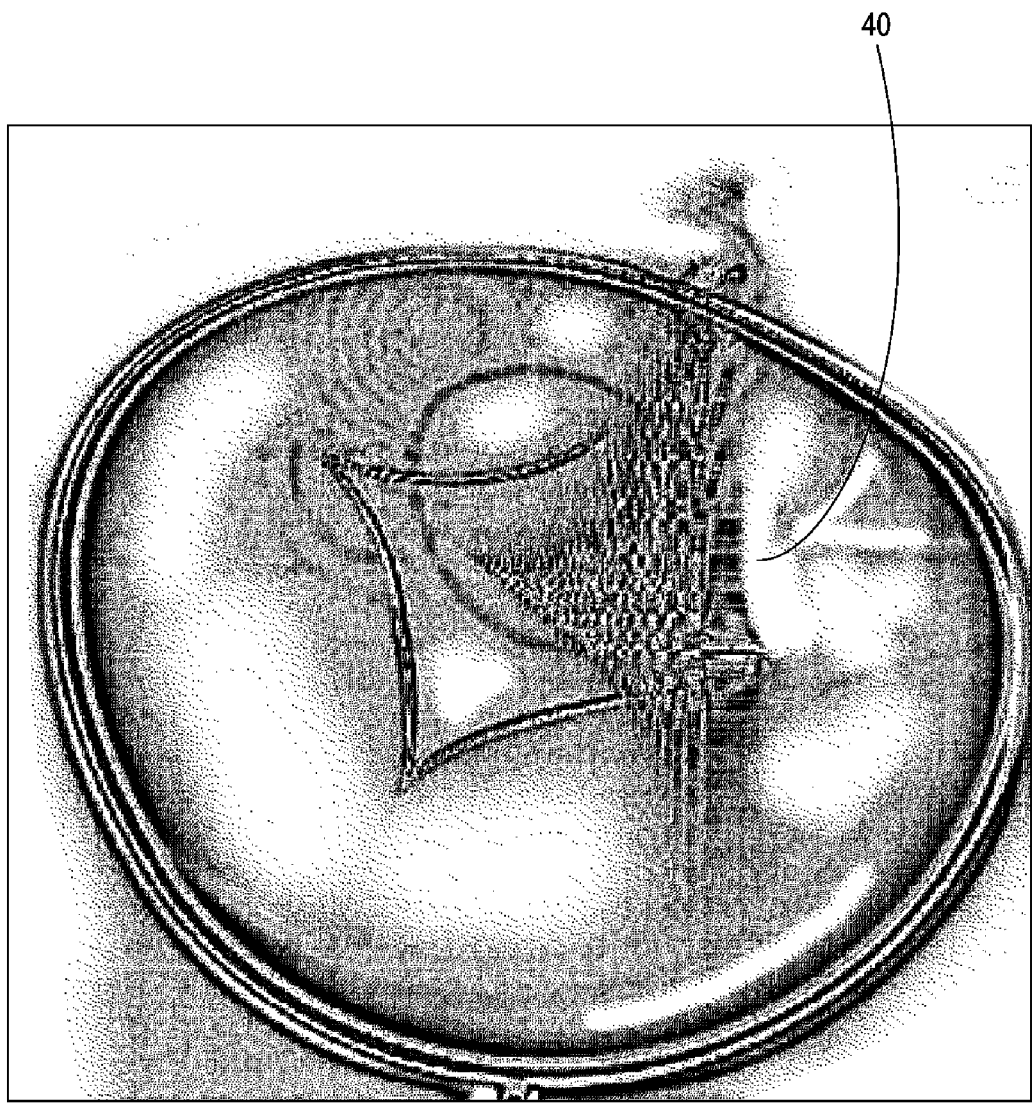
FIG. 4 illustrates exemplary wave propagation modeling according to the prior art, Alkhalifah's approximation where f=1.
Figure 5:
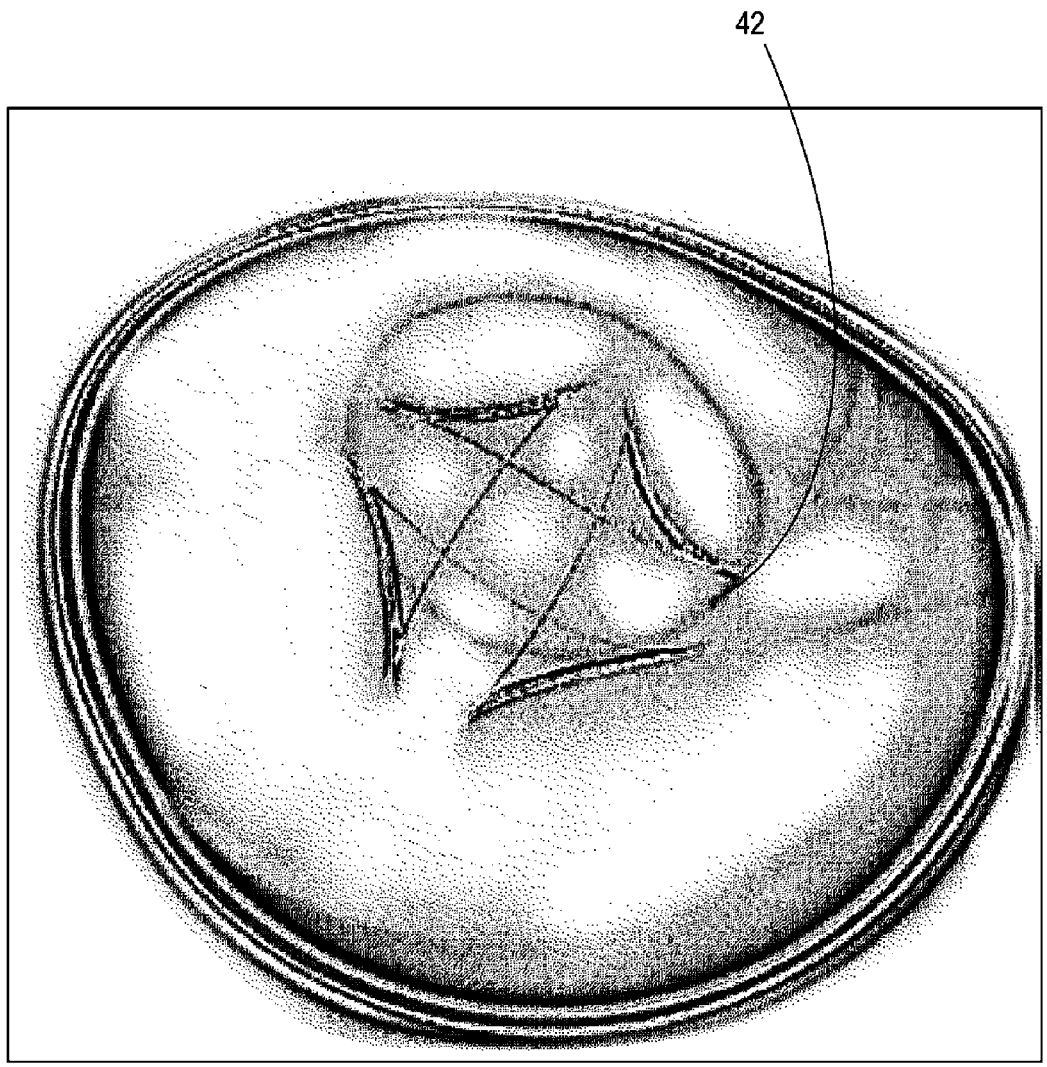
FIG. 5 illustrates exemplary wave propagation modeling according to one embodiment of the present invention.

The present invention provides several advantages relative to conventional acoustic, anisotropic modeling and migration. The present invention provides a stable way of wave propagation in TI media with variable tilt, thus simulated wavefield propagation and images of reflectivity can be obtained. Prior art pseudo-acoustic modeling and migration methods are based on Alkhalifah's approximation in which the phase velocity of shear waves is set to zero along the axis of symmetry. Although the prior art methods can work in a constant-tilt TI medium, the zero-speed shear-waves can make wave propagation unstable (i.e. amplitudes become unbounded) in areas where tilt variations can locally concentrate high energy near the axis of symmetry. FIG. 4 shows that prior art methods (f=1) are unstable 40 in a variable-tilt medium (e.g. near the crest of an anticlinal structure). On the contrary, FIG. 5 shows that wave propagation based on the present invention (f=0.98) remains stable 42 in the same medium. In addition, the present invention can provide the flexibility of controlling shear- to P-wave velocity ratios to optimize the results of modeling and migration. For example, shear- and P-wave velocity ratios can be set close to the actual values to approximate the kinematics in elastic wave propagation. Furthermore, in certain rocks, the vertical velocity may be greater than the horizontal velocity with respect to the axis of symmetry. In such a case, wave equations based on Alkhalifah's approximation will result in negative stiffness matrix thereby producing unstable wavefields regardless numerical implementation algorithms. The present invention can use a finite shear-wave velocity to ensure positive stiffness coefficients in the stress-strain relations thereby generating stable wave propagation.

In prior art methods based on Alkhalifah's approximation, equating shear-wave phase velocity to zero does not eliminate shear waves. Instead, high energy concentrates near the axis of symmetry. The only exception is elliptic anisotropy, (i.e., $\epsilon=\delta$), for which shear waves vanish everywhere. In the present invention, vertical shear velocity is relaxed from being zero, hence, the energy is less concentrated near the axis of symmetry. Shear waves will not vanish because of the presence of additional cross derivatives even if the conditions of elliptical anisotropy are satisfied.

In terms of computational cost, the PDEs utilized by embodiments of the present invention involve additional spatial derivative terms to be computed compared to prior art methods. In areas with variable tilt, the additional workload associated with non-zero $Vs_0$ is necessary to achieve stability and reliability required by seismic modeling and migration. In areas of nearly constant or very smooth tilt, the additional workload may be skipped.

It will be clear to one skilled in the art that the above embodiments may be altered in many ways without departing from the scope of the invention. For example, as is apparent to one skilled in the art, different initial conditions or boundary conditions or a different linear combination of the PDEs in the present invention can be used in modeling and migration as convenient.

In one embodiment of the present invention, the anisotropic modeling method includes establishing a velocity and anisotropy model corresponding to a seismic exploration volume; setting initial conditions such as source excitation; propagating waves in transversely isotropic media with a tilted or vertical axis of symmetry, according to eq. [1] or its equivalent. For forward modeling, a source function of the form $\delta(\vec{x}-\vec{x}_s)w(t)$ needs to be introduced in the right side of equations in eq. [1] or eq. [2], where $\vec{x}_s$ is the source location, and w(t) is a source wavelet.

In the above-described embodiment of the present invention, the vertical shear-wave velocity in eq. [3] can be non-zero (therefore f can be different from 1) in contrast to the prior art method approximation where f rounds off to 1. Accordingly, the phase velocity of shear waves in the direction of both parallel and perpendicular to the axis of symmetry can be non-zero in the present invention. In a medium with variable tilt, the finite speed of quasi-shear waves can avoid local concentration of high energy which often occurs in the vicinity of the axis of symmetry. The present invention does not require weak anisotropy assumptions.

Utilizing the above PDEs, other embodiments of the present invention can be derived for anisotropic media. If tilt $\theta_0=0$, the above PDEs simplify to a 3D VTI system, and similarly a 3D HTI system when $\phi_0=0$. A second-order 3×3 system for 3D VTI media can take of the form in equation 6. This system of PDEs is extendable to its equivalent formulation for a tilted TI medium by replacing $g_1$ and $g_2$ given in eq. [6] by $f_1$ and $f_2$ given in eq. [1].

As an alternative to the PDEs in eq. [1] or [2] or [4] when f=1, the first-order 5×5 system of PDEs in eq. [5] is hyperbolic and stable in a TI medium with variable tilt. This embodiment of the present invention is symmetrizably hyperbolic (well-posed, even with variable coefficients). This system is also extendable to variable-tilt TTI. The above complete first-order 5×5 system of PDEs in 3D reduces to 4×4 in 2D.

As described above, additional embodiments of the present invention also provide pseudo-acoustic migration methods. One embodiment includes the steps of: establishing a seismic data set and a velocity/anisotropy model corresponding to a seismic exploration volume; setting boundary conditions of wave propagation; propagating waves from source excitation and recorded seismic data separately in anisotropic media according to eq. [1], eq. [2], eq. [4], or eq. [6], or their equivalents; and applying imaging conditions such as, but not limited to, cross correlation between the two propagated wavefields to obtain subsurface images. Different initial and/or boundary conditions can be applied without affecting the scope of this invention. An exemplary boundary condition (e.g., based on eq. [1]) for propagating a source wavelet is as follows:

$$\begin{cases} P(x,y,z=0;t) = \delta(\vec{x}-\vec{x}_s)\int_0^t w(t')dt' \\ Q(x,y,z=0;t) = \delta(\vec{x}-\vec{x}_s)\int_0^t w(t')dt' \end{cases} \quad [10]$$

and the boundary condition for reverse time extrapolation of seismic data is as follows:

$$\begin{cases} P(x,y,z=0;t) = D(x,y,x_s,y_s;t) \\ Q(x,y,z=0;t) = D(x,y,x_s,y_s;t) \end{cases} \quad [11]$$

where w(t) is a source function, $x_s$ is the location of source, $D(x,y,x_s,y_s;t)$ is a shot record to migrate.

The following example illustrates a further embodiment of the present invention:

1. Establishing Fourth-Order Dispersion Relations for Quasi-P Wave in VTI Media

Tsvankin's phase velocity relations for VTI media for which $v_{s0}$ is not set to zero lead to the dispersion relation:

$$\omega^4 - B\omega^2 + C = 0 \quad [12]$$

where:

$$\begin{cases} B = [(1+2\eta)v_{nmo}^2 + av_{p_0}^2]k_h^2 + (1+a)v_{p_0}^2 k_z^2 \\ C = a(1+2\eta)v_{nmo}^2 v_{p_0}^2 k_h^4 + [(2\eta+a)v_{nmo}^2 v_{p_0}^2 + av_{p_0}^4]k_h^2 k_z^2 + av_{p_0}^4 k_z^4 \end{cases} \quad [13]$$

$\omega$ is angular frequency, $k_z$ is the vertical wavenumber, and $k_h^2 = k_x^2 + k_y^2$ is the [square of the] magnitude of the horizontal wavenumber vector ($k_x$, $k_y$). Eq. [12] admits two pairs of solutions:

$$\begin{cases} \omega_{qP\pm} = \pm\sqrt{\dfrac{B+\sqrt{B^2-4C}}{2}} \\ \omega_{qS\pm} = \pm\sqrt{\dfrac{B-\sqrt{B^2-4C}}{2}} \end{cases} \quad [14]$$

$\omega_{qP\pm}$ correspond to quasi-P waves; $\omega_{qS\pm}$ correspond to quasi-SV waves.

2. Establishing a Fourth-Order PDE for Quasi-P Wave in VTI Media

Applying eq. [12] to the wavefield $\hat{F}(k_x, k_x, k_x, \omega)$ in the Fourier domain and taking the inverse Fourier transform (F(x, y, z, t)) provide:

$$\frac{\partial^4}{\partial t^4}F - \left\{[(1+2\eta)v_{nmo}^2 + av_{p_0}^2]\left(\frac{\partial^4}{\partial x^2 \partial t^2}F + \frac{\partial^4}{\partial y^2 \partial t^2}F\right) + \right. \quad [15]$$
$$(1+a)v_{p_0}^2\left(\frac{\partial^4}{\partial z^2 \partial t^2}F\right)\bigg\} +$$
$$a(1+2\eta)v_{nmo}^2 v_{p_0}^2\left(\frac{\partial^4}{\partial x^4}F + \frac{\partial^4}{\partial x^2 \partial y^2}F + \frac{\partial^4}{\partial y^4}F\right) +$$
$$[(2\eta+a)v_{nmo}^2 v_{p_0}^2 + av_{p_0}^4]\left(\frac{\partial^4}{\partial x^2 \partial z^2}F + \frac{\partial^4}{\partial y^2 \partial z^2}F\right) + av_{p_0}^4\left(\frac{\partial^4}{\partial z^4}F\right) = 0$$

3. Establishing a Second-Order 3×3 System of PDEs for VTI Media

Let:

$$P(x, y, z, t) = \frac{\partial^2}{\partial t^2} F(x, y, z, t) \quad [16]$$

where F(x,y,z,t) is a wavefield satisfying eq. [15]. Assuming the initial conditions $$F(x, y, z, t = 0) \equiv \frac{\partial}{\partial t} F(x, y, z, t = 0) \equiv 0 \quad [17]$$

leads to:

$$F(x,y,z,t) = \int_0^t \int_0^{t'} P(x,y,z,t'')dt''dt'$$

Let:

$$\begin{cases} Q(x, y, z, t) = v_{p_0}^2 \left(\frac{\partial^2}{\partial x^2}F + \frac{\partial^2}{\partial y^2}F\right) \\ \qquad = \int_0^t \int_0^{t'} \left(\frac{\partial^2}{\partial x^2}P + \frac{\partial^2}{\partial y^2}P\right)(x, y, z, t'')dt''dt' \\ R(x, y, z, t) = v_{p_0}^2 \left(\frac{\partial^2}{\partial z^2}F\right) \\ \qquad = \int_0^t \int_0^{t'} \left(\frac{\partial^2}{\partial z^2}P\right)(x, y, z, t'')dt''dt' \end{cases} \quad [19]$$

Eq. [15] is then equivalent to the second-order 3×3 system of PDEs by eq. [4].

Figure 6:
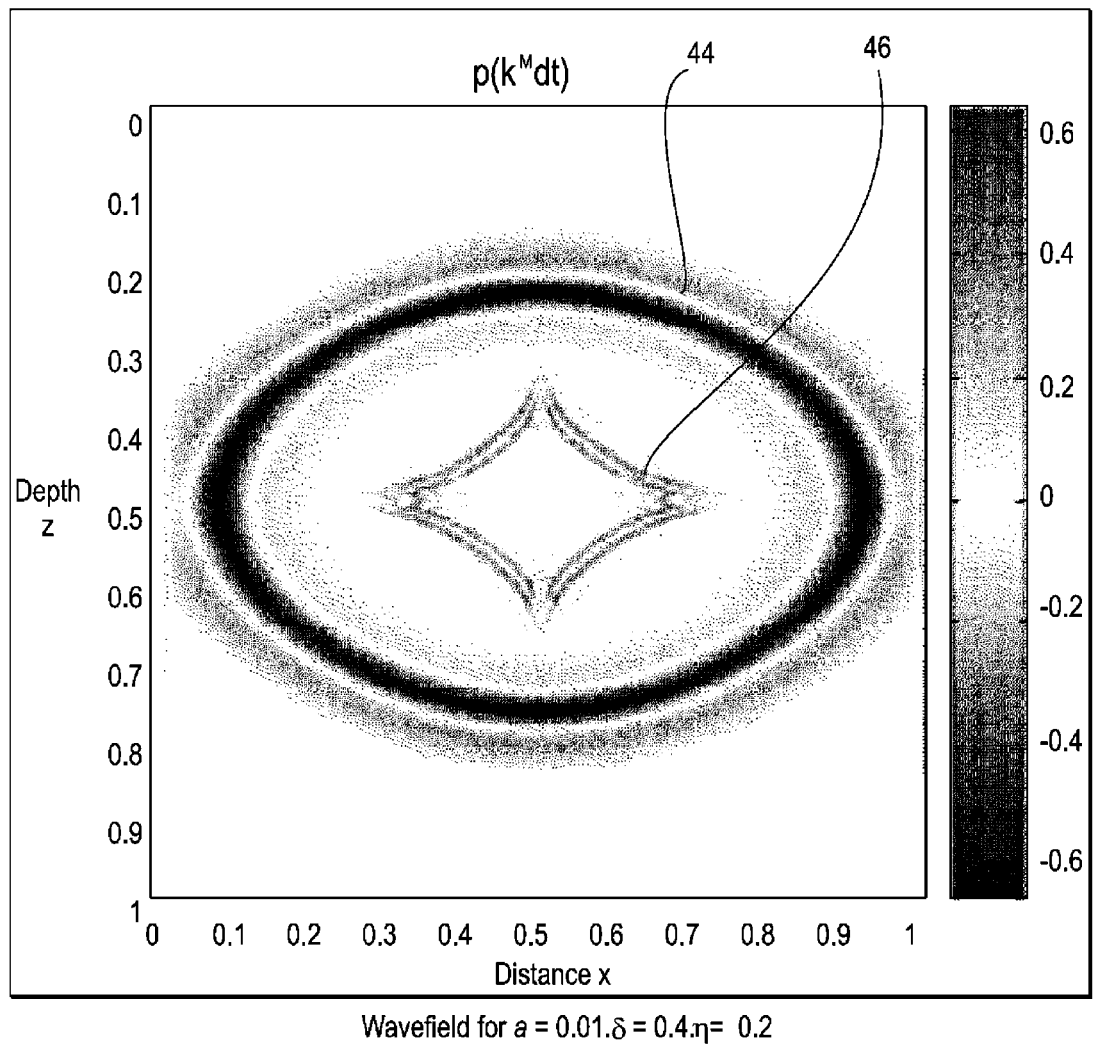
FIG. 6 illustrates exemplary wave propagation modeling according to one embodiment of the present invention where $Vs_0/Vp_0=0.01$.
Figure 7:
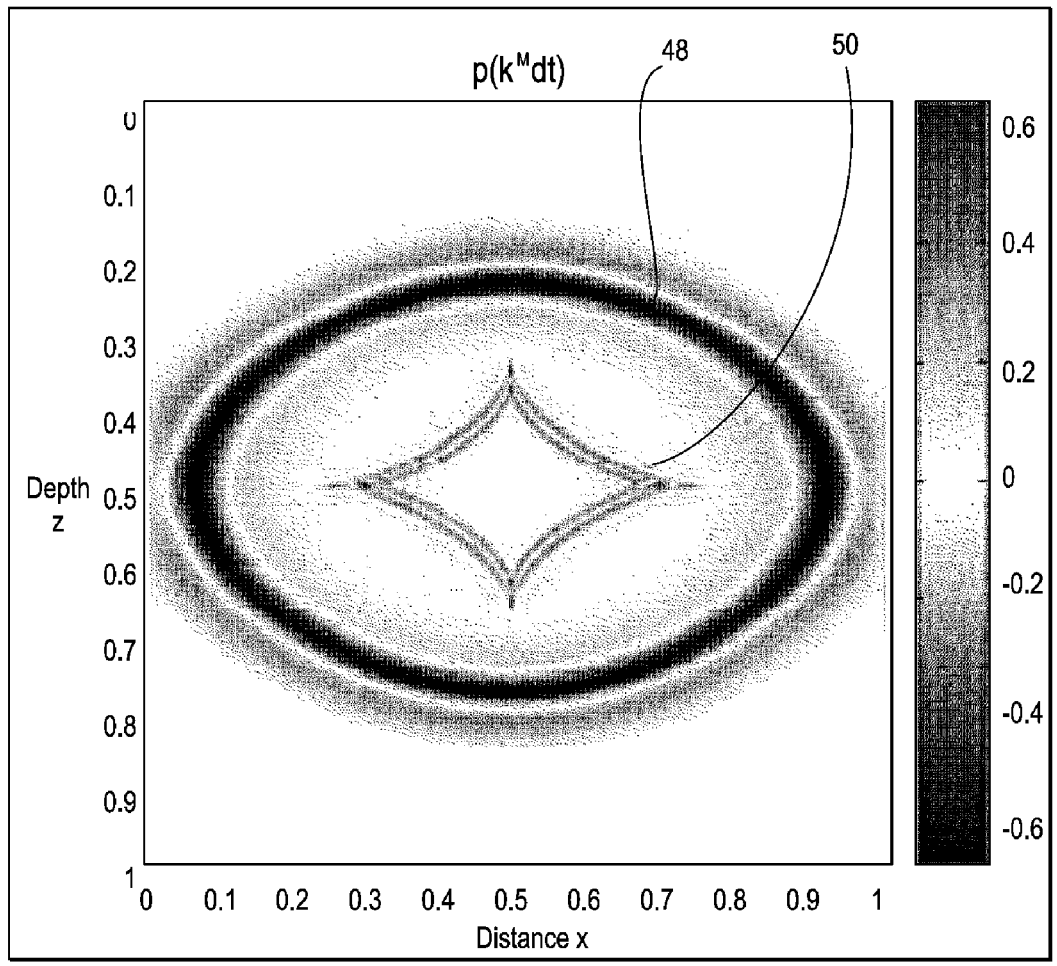
FIG. 7 illustrates exemplary wave propagation modeling according to the prior art, Alkhalifah's approximation where $Vs_0=0$.
Figure 8:
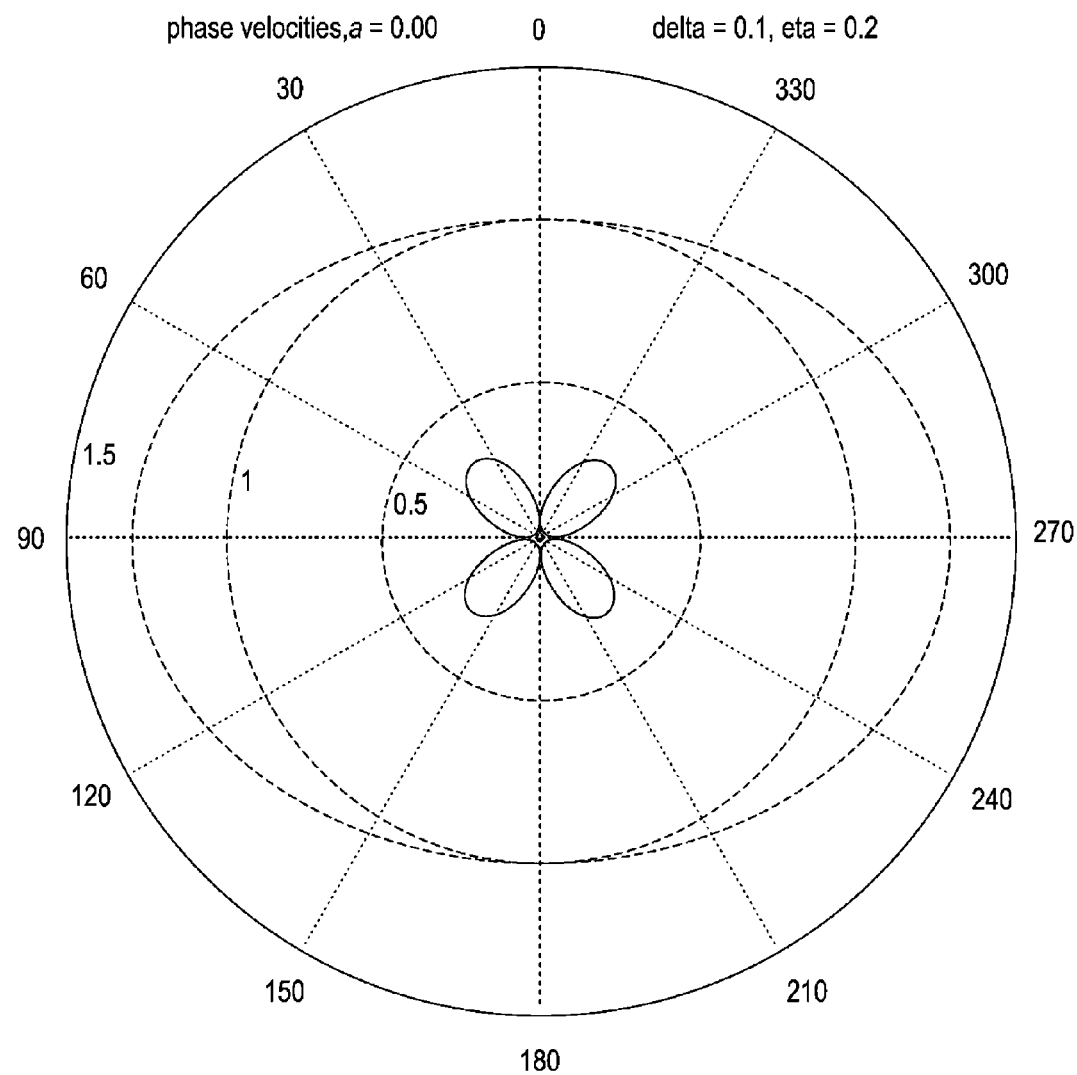
FIG. 8 illustrates an exemplary phase velocity distribution according to the prior art, Alkhalifah's approximation.
Figure 9:
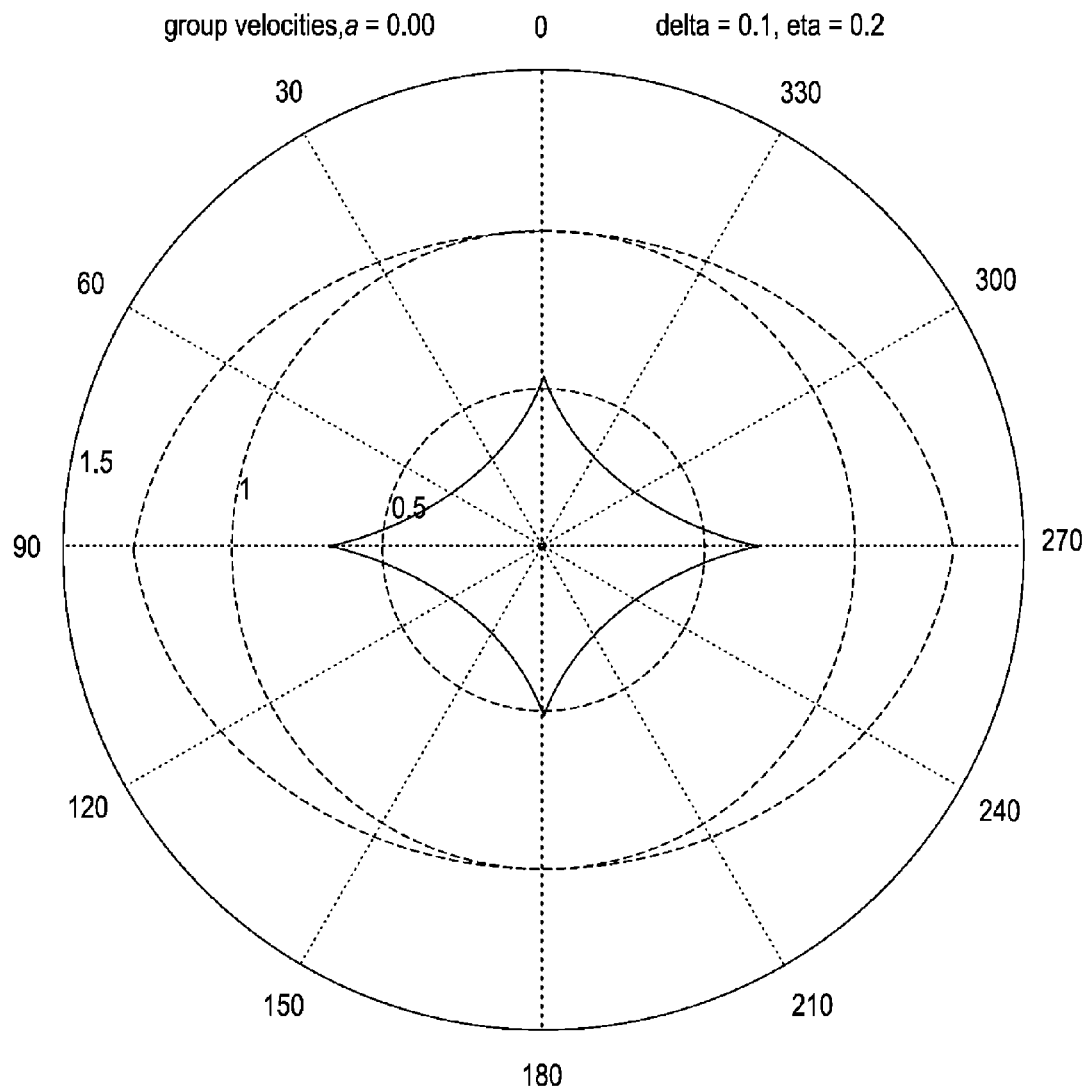
FIG. 9 illustrates an exemplary group velocity distribution according to the prior art, Alkhalifah's approximation.
Figure 10:
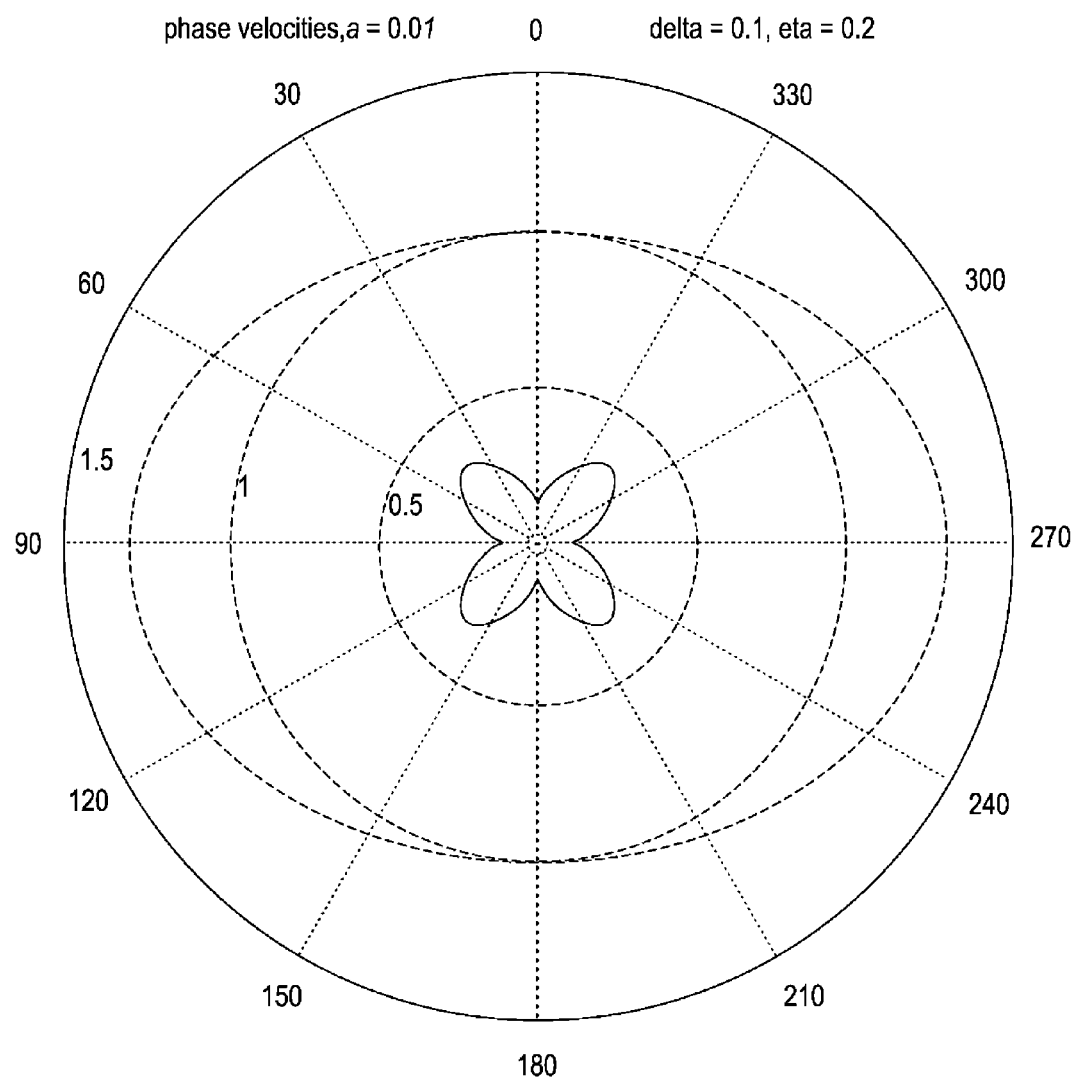
FIG. 10 illustrates an exemplary phase velocity distribution for one embodiment of the present invention where $Vs_0/Vp_0=0.01$.
Figure 11:
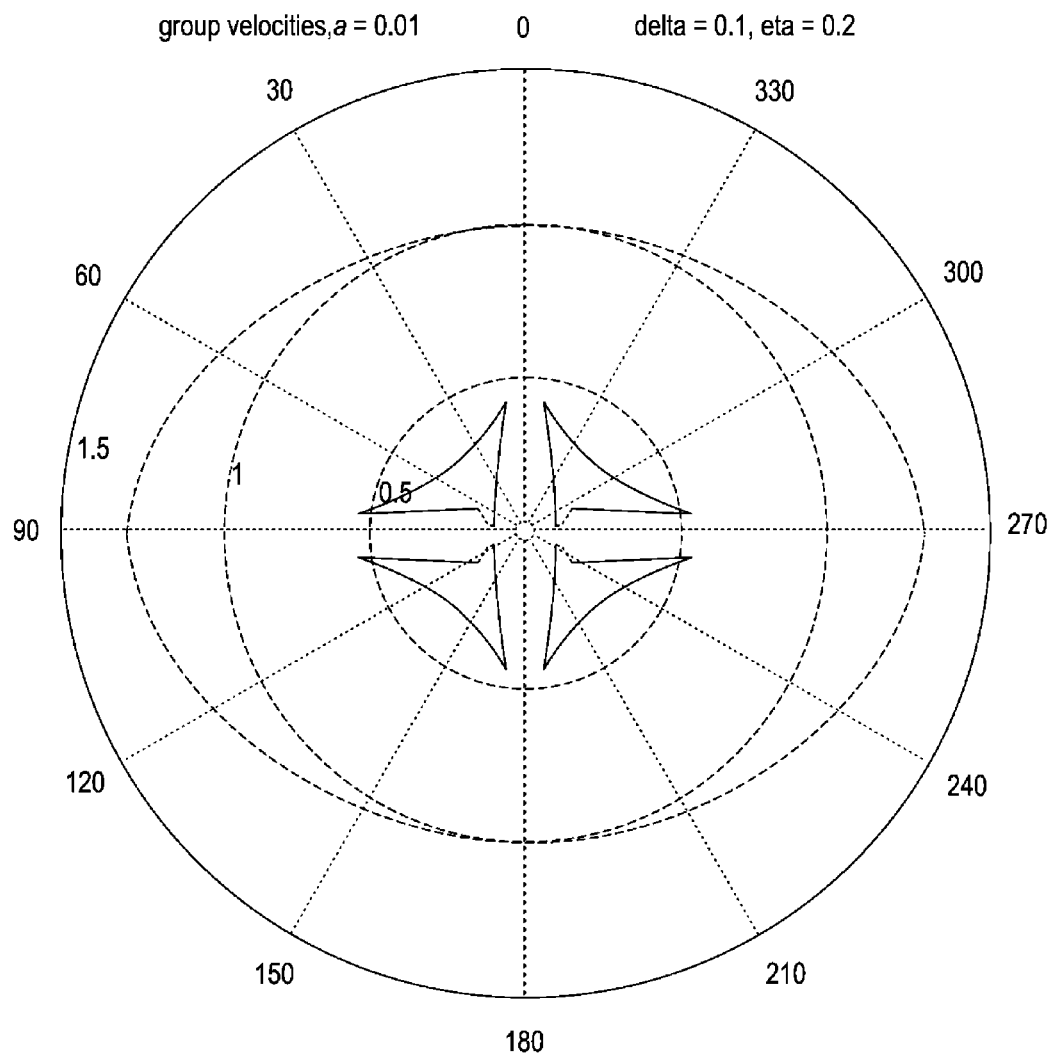
FIG. 11 illustrates an exemplary group velocity distribution for one embodiment of the present invention where $Vs_0/Vp_0=0.01$.

FIG. 6 shows a wavefront propagation in a VTI medium using the above PDEs for that particular embodiment of the present invention. Compared to the wavefronts based on the prior art methods (illustrated in FIG. 7), the outer qP-wavefront (44 in FIG. 6 and 48 in FIG. 7) remains almost identical, but the inner qSV-wavefront (46 in FIG. 6 and 50 in FIG. 7) has a different form from a diamond shape. FIG. 8 and FIG. 9 show the phase and group velocities, respectively, according to Alkhalifah's (prior art) approximation. In contrast, FIG. 10 and FIG. 11 show the phase and group velocities, respectively, according to an embodiment of the present invention. Compared to Alkhalifah's approximation, the phase velocities of qSV waves are relaxed from being zero along the axis of symmetry. Consequently, the maximum values of group velocities or high energy are not so focused along the axis of symmetry as in the prior art methods. The same observations are applicable to a constant-tilt TTI medium by applying a rotation about the tilt.

4. Establishing a First-Order 5×5 System of PDEs for VTI Media

Du et al. (2008) presents the following second-order 2×2 system of PDEs for VTI media with $v_{s0}=0$:

$$\begin{cases} \frac{\partial}{\partial t} p = (1+2\eta)v_{nmo}^2 g_2 p + v_{p_0}^2 g_1 q \\ \frac{\partial}{\partial t} q = v_{nmo}^2 g_2 p + v_{p_0}^2 g_1 q \end{cases} \quad [20]$$

where $g_1$ and $g_2$ are given after eq. [6], p is a scalar wavefield, and q is an auxiliary function. A new wavefield P is defined and new auxiliary functions U, V, Q, and R by:

$$P = \frac{\partial}{\partial t}p, \quad U = \frac{\partial}{\partial x}p, \quad V = \frac{\partial}{\partial y}p, \quad [21]$$
$$Q = \frac{\partial}{\partial t}\left(\frac{(1+2\eta)q - p}{2\eta}\right), \quad R = (1+2\eta)\frac{\partial}{\partial z}q.$$

Then equation 5 is a complete first-order 5×5 system of PDEs. This system can be shown to be hyperbolic by symmetrizing it. Let:

$$\tilde{P} = P, \quad \tilde{U} = v_{nmo}\sqrt{1+2\eta}\, U, \quad [22]$$
$$\tilde{V} = v_{nmo}\sqrt{1+2\eta}\, V, \quad \tilde{Q} = \sqrt{2\eta}\, Q, \quad \tilde{R} = \frac{v_{p_0}}{\sqrt{1+2\eta}}R.$$

Then:

$$\frac{\partial}{\partial t}\begin{bmatrix}\tilde{P}\\\tilde{U}\\\tilde{V}\\\tilde{Q}\\\tilde{R}\end{bmatrix} = M_x \frac{\partial}{\partial x}\begin{bmatrix}\tilde{P}\\\tilde{U}\\\tilde{V}\\\tilde{Q}\\\tilde{R}\end{bmatrix} + M_y \frac{\partial}{\partial y}\begin{bmatrix}\tilde{P}\\\tilde{U}\\\tilde{V}\\\tilde{Q}\\\tilde{R}\end{bmatrix} + M_z \frac{\partial}{\partial z}\begin{bmatrix}\tilde{P}\\\tilde{U}\\\tilde{V}\\\tilde{Q}\\\tilde{R}\end{bmatrix} \quad [23]$$

where:

$$M_x = \begin{bmatrix} 0 & v_{nmo}\sqrt{1+2\eta} & 0 & 0 & 0 \\ v_{nmo}\sqrt{1+2\eta} & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \quad [24]$$

$$M_y = \begin{bmatrix} 0 & 0 & v_{nmo}\sqrt{1+2\eta} & 0 & 0 \\ 0 & 0 & 0 & 0 & 0 \\ v_{nmo}\sqrt{1+2\eta} & 0 & 0 & 0 & 0 \\ 0 & 0 & 0 & 0 & 0 \\ 0 & 0 & 0 & 0 & 0 \end{bmatrix} \quad [25]$$

$$M_z = \begin{bmatrix} 0 & 0 & 0 & \frac{v_{P_0}}{\sqrt{1+2\eta}} & 0 \\ 0 & 0 & 0 & 0 & 0 \\ 0 & 0 & 0 & 0 & 0 \\ \frac{v_{P_0}}{\sqrt{1+2\eta}} & 0 & 0 & 0 & \frac{v_{P_0}\sqrt{2\eta}}{\sqrt{1+2\eta}} \\ 0 & 0 & 0 & \frac{v_{P_0}\sqrt{2\eta}}{\sqrt{1+2\eta}} & 0 \end{bmatrix} \quad [26]$$

In 2D, the variable V is eliminated and the third equation is deleted, resulting in a first-order 4×4 system.

Figure 12:
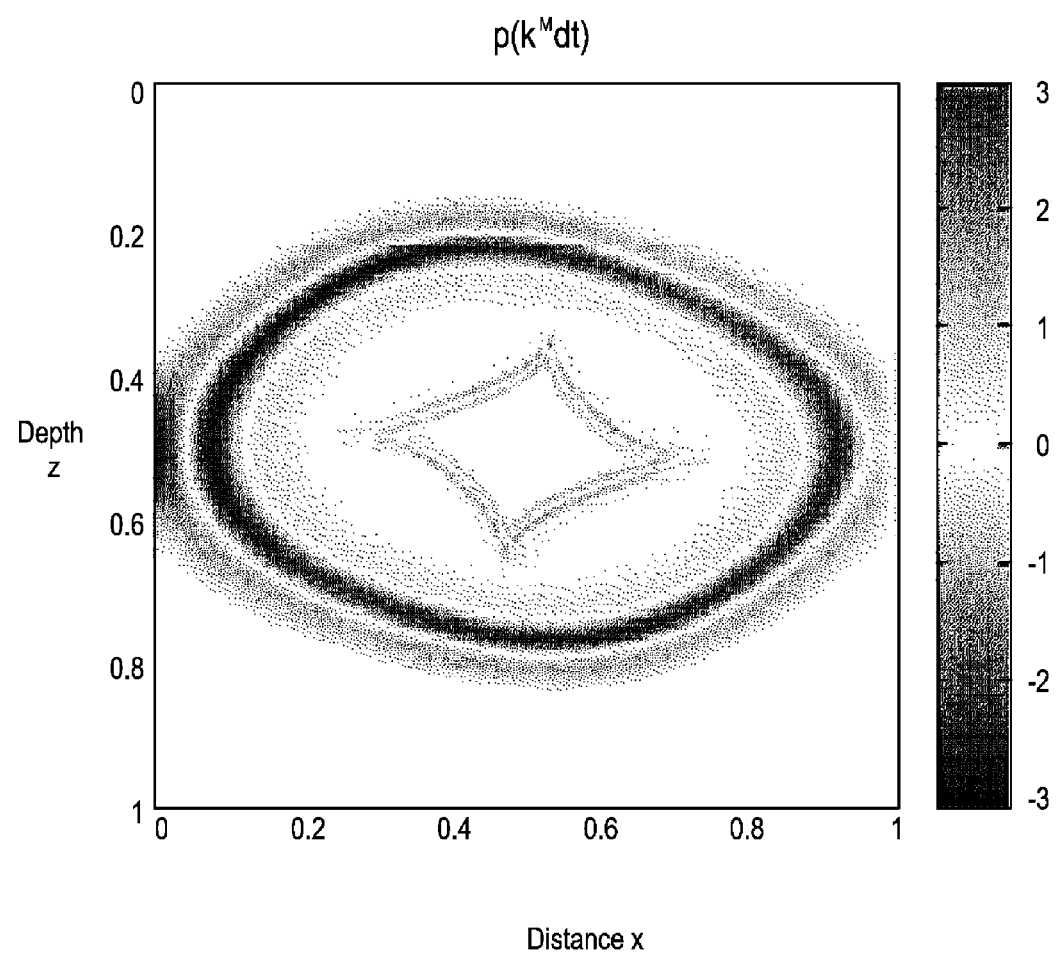
FIG. 12 illustrates an exemplary wave propagation modeling in a medium with a variable tilted axis of symmetry, according to one embodiment of the present invention utilizing a first-order 5×5 PDE system.

FIG. 12 shows stable wavefront propagation governed by such first-order PDEs in a variable-tilt medium.

5. Establishing Fourth-Order Dispersion Relations in TTI Media

By relaxing Alkhalifah's approximation that $V_{S_0}=0$ (or $f=1$) along the axis of symmetry, the following equation can be derived from Tsvankin's phase velocity relations (2001):

$$\begin{cases} \frac{\cos^2\overline{\theta}}{v^2} = \frac{[f/2+\varepsilon\sin^2\overline{\theta}]^2 - \left\{\frac{v^2}{v_{P_0}^2} - [1+\varepsilon\sin^2\overline{\theta}] + f/2\right\}^2}{2fv^2(\varepsilon-\delta)\sin^2\overline{\theta}} \\ f = 1 - \left(\frac{v_{S_0}}{v_{P_0}}\right)^2 \end{cases}$$

where phase velocity v has roots of two magnitudes: one for quasi-P waves, and the other for quasi-SV waves $\overline{\theta}$ is the angle between the wavefront normal and the axis of symmetry, and other parameters are defined in eq. [1].

Figure 13:
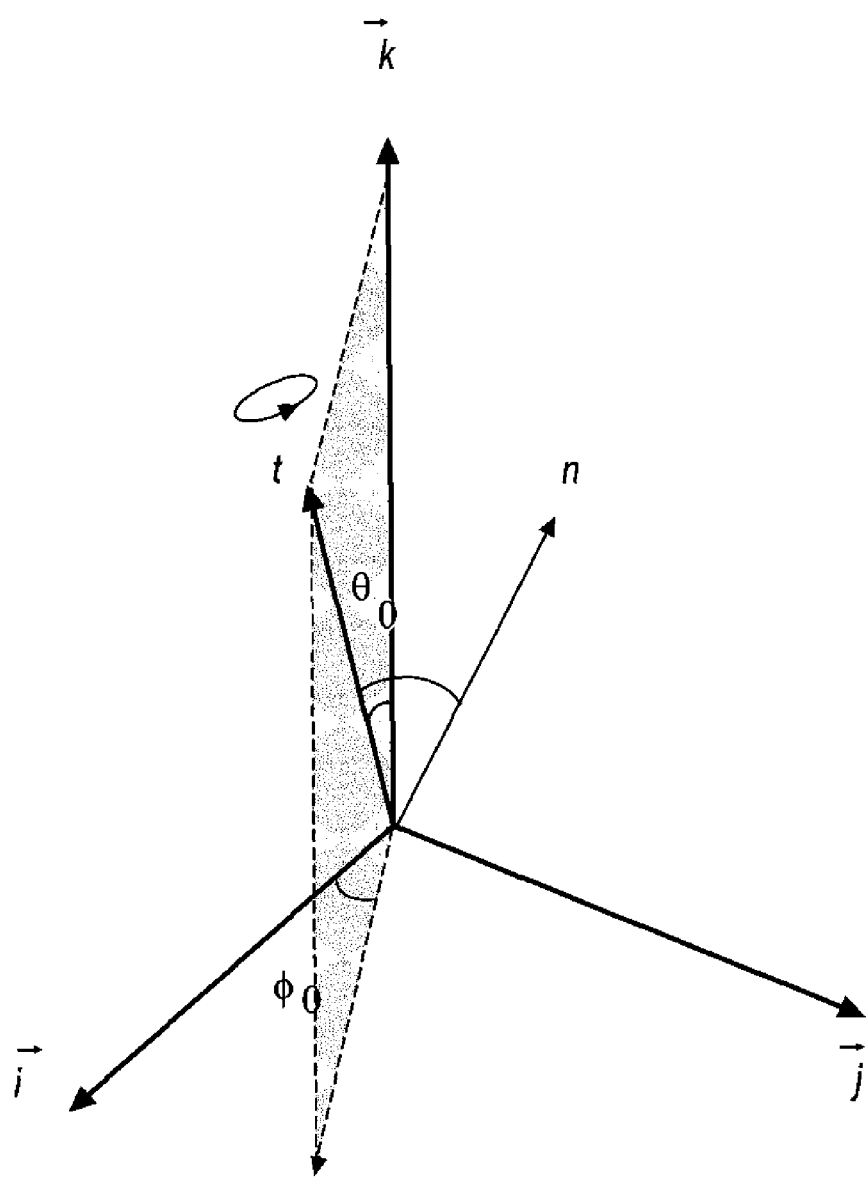
FIG. 13 illustrates a schematic diagram of the geometry that is used in one embodiment of the present invention.

According to the geometry shown in FIG. 13, the wavefront normal ($\vec{n}$) and the axis of symmetry ($\vec{t}$) and the angle in between take the following form:

$$\begin{cases} \vec{n} = \sin\theta\cos\phi\vec{i} + \sin\theta\sin\phi\vec{j} + \cos\theta\vec{k} \\ \vec{t} = \sin\theta_0\cos\phi_0\vec{i} + \sin\theta_0\sin\phi_0\vec{j} + \cos\theta_0\vec{k} \\ \cos\overline{\theta} = \frac{\vec{n}\cdot\vec{t}}{|\vec{n}||\vec{t}|} = \sin\theta\cos\phi\sin\theta_0\cos\phi_0 + \sin\theta\sin\phi\sin\theta_0\sin\phi_0 + \cos\theta\cos\theta_0 \end{cases}$$

where $\theta_0$ is the tilt of the axis of symmetry with respect to the vertical in a TI medium, and $\phi_0$ is the azimuth of the axis of symmetry. Recognizing that:

$$\begin{cases} \sin\theta\cos\phi = k_x v/\omega \\ \sin\theta\sin\phi = k_y v/\omega \\ \cos\theta = k_z v/\omega, \end{cases}$$

the following fourth-order dispersion relations can be derived:

$$\omega^4 - v_{P_0}^2[(1+2\varepsilon)f_2 + f_1 - (f-1)f_3]\omega^2 + v_{P_0}^4[2f(\varepsilon-\delta)f_1 f_2 - (f-1)((1+2\varepsilon)f_2 + f_1)f_3] = 0 \quad [27]$$

6. Establishing a Fourth-Order PDE in TTI Media

Multiplying both sides of the above fourth-order dispersion relation with a scalar wavefield P, and converting the frequency-wavenumber operators to the time-space domain, the fourth-order PDE for TTI/VTI media takes of the form of eq. [8].

7. Establishing a Second-Order 2×2 System of PDEs for TTI Media

The above fourth-order pseudo-acoustic PDE for TTI media can be solved by the 2×2 time- and space-domain PDE system by eq. [3]:

$$\text{Where} \begin{cases} v_h = v_{P_0}\sqrt{1+2\varepsilon} \\ v_n = v_{P_0}\sqrt{1+2\delta}, \end{cases}$$

the 2×2 system of PDEs can also take an equivalent form in terms of horizontal velocity $v_h$ and normal-moveout (NMO) velocity $v_n$.

In a 2D medium as a special case, the above PDEs still remain valid with the following simplified spatial derivative operators:

$$\begin{cases} f_1 = \left(\sin^2\theta_0 \frac{\partial^2}{\partial x^2} + \cos^2\theta_0 \frac{\partial^2}{\partial z^2} + \sin 2\theta_0 \frac{\partial}{\partial x}\frac{\partial}{\partial z}\right) \\ f_2 = \left(\cos^2\theta_0 \frac{\partial^2}{\partial x^2} + \sin^2\theta_0 \frac{\partial^2}{\partial z^2} + \sin 2\theta_0 \frac{\partial}{\partial x}\frac{\partial}{\partial z}\right) \end{cases}$$

8. Establishing a Second-Order 3×3 System of PDEs for TTI Media

As an alternative, the fourth-order pseudo-acoustic PDE for TTI media can also be solved by a 3×3 time- and space-domain PDEs in eq. [4] or its equivalents using a different linear combination.

Figure 14:
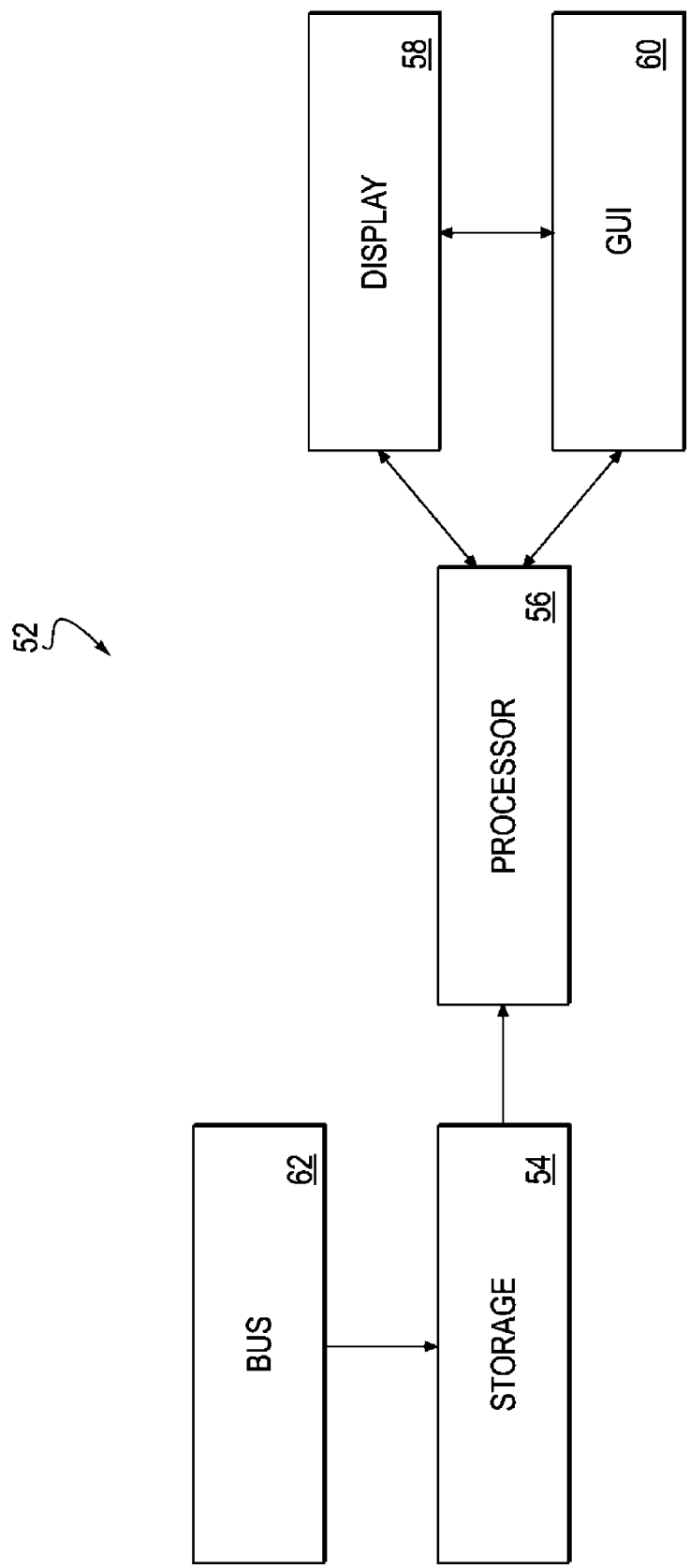
FIG. 14 illustrates is a schematic illustration of an embodiment of a system for performing methods in accordance with embodiments of the present invention.

Embodiments of the present invention can be implemented on either co-processor accelerated architectures, such as Field-Programmable-Gate-Arrays (FPGAs), Graphics-Processing-Units (GPUs), Cells, or general-purpose computers. The present invention provides apparatus and general-purpose computers and/or co-processors programmed with instructions to perform a method for the present invention, as well as computer-readable media encoding instructions to perform a method of the present invention. A system for performing an embodiment of the present invention is schematically illustrated in FIG. 14. A system 52 includes a data storage device or memory 54. The stored data may be made available to a processor 56, such as a programmable general purpose computer. The processor 56 may include interface components such as a display 58 and a graphical user interface 60. The graphical user interface (GUI) may be used both to display data and processed data products and to allow the user to select among options for implementing aspects of the method. Data may be transferred to the system 52 via a bus 62 either directly from a data acquisition device, or from an intermediate storage or processing facility (not shown).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A computer-implemented method of generating a seismic data set corresponding to a computer-generated modeling geometry for a subsurface region of interest, comprising:
   establishing a seismic exploration volume for the subsurface region of interest;
   determining the modeling geometry;
   propagating at least one wavefield through the seismic exploration volume utilizing the modeling geometry for initial conditions;
   preventing the accumulation of quasi-shear wave energy along an axis of symmetry of anisotropic regions located within the seismic exploration volume;
   ensuring positive stiffness coefficients in stress-strain relations in the at least one wavefield utilizing finite quasi-shear wave velocities thereby to stabilize the wavefield, and
   utilizing the stabilized wavefield to generate subsurface seismic images of the subsurface region of interest;
   wherein each of the foregoing steps is performed by a processor operating in conjunction with a data storage device or memory, the processor being configured to execute instructions to perform each of the foregoing steps, and the resulting subsurface images corresponding to the seismic data set are representative of pseudo acoustic quasi-P wave propagation configured to remain stable in variable tilt anisotropic media that is not limited by weak anisotropic conditions.

2. The method of claim 1, wherein propagating at least one wavefield through the seismic exploration volume further comprises employing an artificial quasi-shear wave velocity that is greater than or equal to zero along the axis of symmetry.

3. The method of claim 1, wherein propagating at least one wavefield through the seismic exploration volume further comprises restricting accumulation of quasi-shear waves along the axis of symmetry.

4. The method of claim 1, further comprising propagating a plurality of wavefields through the seismic exploration volume.

5. The method of claim 1, wherein propagating at least one wavefield through the seismic exploration volume further comprises at least one of reverse time migration, wave-equation based migration, Gaussian beam migration and Kirchhoff migration.

6. The method of claim 1, further comprising propagating wavefields forwards and backwards through the seismic exploration volume and applying imaging conditions to the forward or backward wavefields and equivalent Green's functions to derive the subsurface images.

7. The method of claim 6, wherein the step of applying imaging conditions further comprises cross-correlating at least one of the forward and backward wavefields and equivalent Green's functions to derive the subsurface images.

8. The method of claim 7, wherein the step of applying imaging conditions further comprises at least one of illumination normalization, reflection-angle domain gather generation and phase-amplitude compensation.

9. The method of claim 1, wherein the modeling geometry includes common offset, common azimuth and common reflection-angle domains.

10. The method of claim 1, wherein propagating at least one wavefield further comprises utilizing at least one of delayed shot, plane-wave and phase encoding.

11. The method of claim 1, wherein propagating the at least one wavefield further comprises utilizing at least one of normal moveout velocity, horizontal velocity and Thomsen parameters.

* * * * *